United States Patent [19]

Gamboa

[11] 4,082,986
[45] Apr. 4, 1978

[54] HIGH VOLTAGE SHUTDOWN CIRCUIT FOR A TELEVISION RECEIVER
[75] Inventor: Paul Gamboa, Chicago, Ill.
[73] Assignee: Zenith Radio Corporation, Glenview, Ill.
[21] Appl. No.: 662,190
[22] Filed: Feb. 27, 1976
[51] Int. Cl.² ........................................ H01J 29/70
[52] U.S. Cl. .................................... 315/411; 358/243
[58] Field of Search .................. 315/411, 387, 389; 178/DIG. 11, 7.3 R; 358/243

[56] References Cited
U.S. PATENT DOCUMENTS 3,970,780  7/1976  Minoura ............................ 315/411
4,013,923  3/1977  den Hollander ................... 315/387

Primary Examiner—Howard A. Birmiel
Assistant Examiner—T. M. Blum
Attorney, Agent, or Firm—Nicholas A. Camasto

[57] ABSTRACT

The television receiver horizontal deflection transformer develops retrace pulses from which the high voltage is generated. A shutdown safety circuit arrangement monitors a predetermined minimum width of retrace pulse by comparing it with the duration of a locally produced standard pulse to determine an excess high voltage condition. When such a condition occurs, voltage is applied to the horizontal driver for disabling the deflection system.

9 Claims, 3 Drawing Figures

U.S. Patent    April 4, 1978    4,082,986
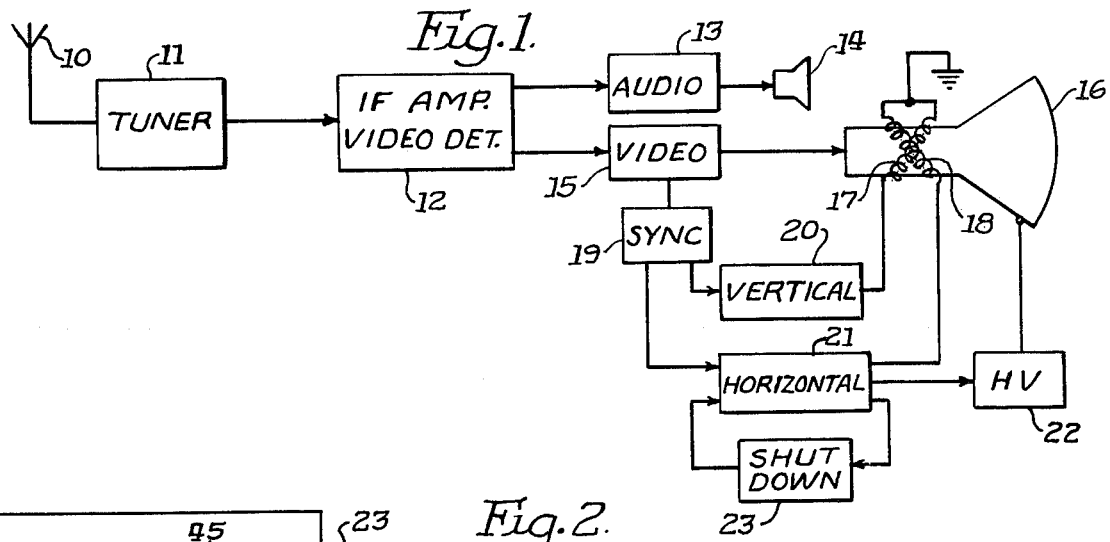
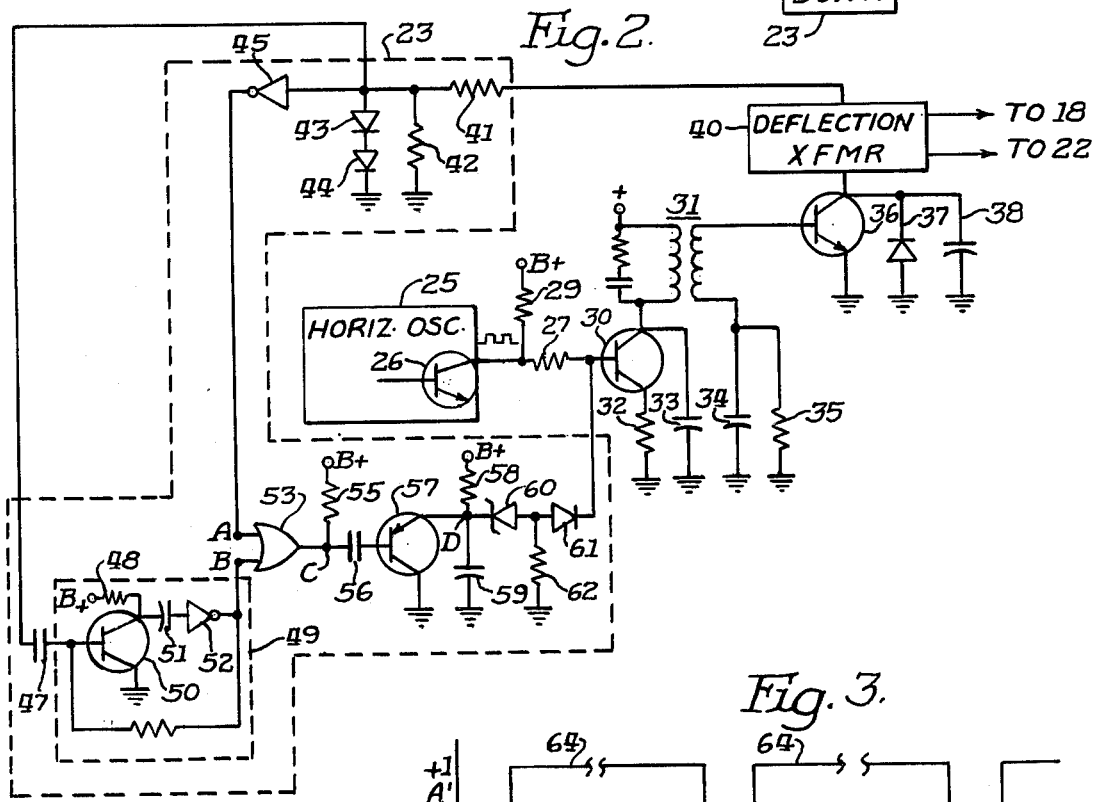
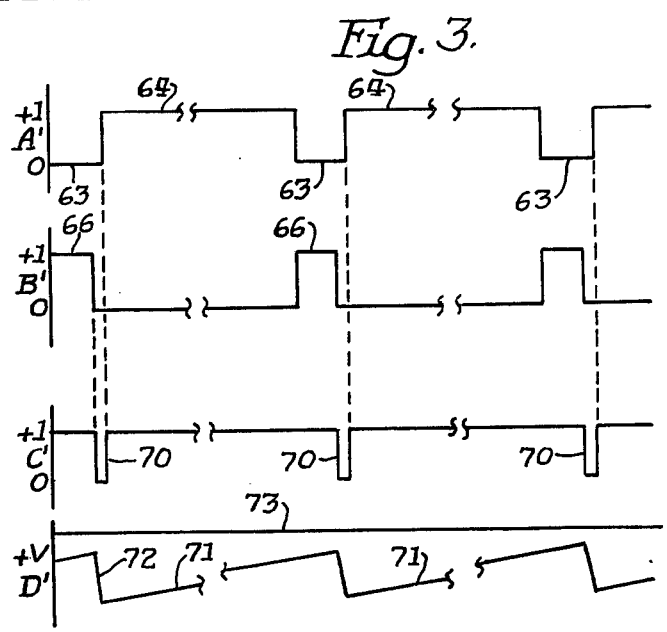

HIGH VOLTAGE SHUTDOWN CIRCUIT FOR A TELEVISION RECEIVER

BACKGROUND OF THE INVENTION

This invention relates to high voltage protection systems for television receivers.

As is well known, the cathode ray "picture tube" used in a television receiver requires a high direct current accelerating potential between the light-emitting phosphor screen deposited on the picture tube faceplate and the electron gun located in the neck of the tube. This potential is variously referred to as the second anode potential, accelerating potential and ultor voltage. Normally it is developed by rectification of the horizontal (line frequency) retrace pulses generated in the deflection system.

Conventional deflection systems are of the reaction-scan type and include an autotransformer which is energized with line frequency current for supplying a magnetic scansion device, such as a yoke located on the picture tube neck, with appropriate currents for producing a magnetic field for deflecting the electron beam emanating from the gun. A portion of the transformer steps up the voltage, and during the retrace interval at the end of each horizontal scan line, a large amplitude voltage pulse is developed upon collapse of the magnetic field. This high voltage retrace pulse is rectified and supplied to the accelerating electrode and phosphor screen of the picture tube. Some systems develop a retrace pulse of substantially the ultor voltage across the transformer, whereas others use multiplying devices for developing full ultor voltage from a lower valued retrace pulse.

It is also common to produce an intermediate level high voltage for other applications in the receiver. This is commonly referred to as a "boost" voltage and its amplitude bears a direct relationship to the amplitude of ultor voltage produced. The ultor voltage in a typical color television receiver may be between 25 and 30 kilovolts and the boost voltage may range around 800 volts. It is also common to develop an intermediate level focus voltage for some picture tube electron guns which may be on the order of 2 KV. The focus voltage is generally derived from the ultor voltage, for example, by an appropriate resistive bleeder network.

The high voltage amplitude in these systems is a function of the horizontal deflection system. The deflection transformer itself is tuned to a harmonic of the horizontal line frequency. Thus changes in tuning caused by changes in component values often give rise to large amplitude increases in the retrace voltage with concomitant increases in the high voltage. The inner and outer conductive coatings on the funnel of the picture tube, in conjunction with the high dielectric of the glass, function as a filter capacitor for the ultor voltage.

Upward changes in the high voltage pose very serious problems including that of damage to the receiver by insulation breakdown of various components. Radiation is also a function of the high voltage present in the receiver. Recently, the U.S. Department of Health, Education and Welfare established compliance standards for television receivers which dictate the maximum allowable radiation which may be emitted under specified fault conditions as well as other safety standards. Becuase of the possible consequences, should receivers be found in "non-compliance" with these standards, it is prudent for manufacturers to take precautions to assure that the receiver high voltage is controlled and that no receiver will be in non-compliance.

As would be expected, a number of techniques and circuit arrangements have evolved for controlling ultor voltage. Even before the government standards, control of high voltage for the purpose of improving receiver performance and optimizing the reproduced display was an important goal of television manufacturers. (Good high voltage regulation helps maintain picture, brightness, size, stability and focus, for example.) Such control circuits sense a characteristic of the deflection system output, such as the high or boost voltage amplitude, and use it in a control loop to adjust the horizontal drive. While the circuits generally perform well, they ordinarily cannot satisfy the stringent "failure-proof" requirements of the government standards, which demand compliance even under imposed fault conditions. Thus the art has been forced into elaborate "fail-safe" systems of high voltage control.

U.S. Pat. No. 3,789,260, issued 1/29/74, discloses a circuit arrangement for sensing amplitude changes in the voltage developed across the horizontal deflection yoke capacitor, which voltage is related to the high voltage developed for the picture tube. In the event the sensed voltage exceeds a certain maximum the horizontal synchronization of the receiver is disabled to render the picture unviewable.

U.S. Pat. No. 3,795,767, issued 3/5/74, monitors the receiver boost voltage and disables the video circuit whenever the boost voltage exceeds a predetermined level. Disabling the video circuit removes the picture from the screen.

U.S. Pat. No. 3,881,135, issued 4/29/75, also monitors boost voltage and, in response to a predetermined rise therein, disables the entire deflection system, which, of course, also disables the ultor and boost voltages.

These three patents are believed representative of prior art approaches for precluding receiver operation under an excessive high voltage condition. There are, of course, many circuit arrangements which attempt to directly limit the magnitude of the high voltage. A well-known example is that of the spark gap which is designed to flash over at a predetermined voltage level. The known prior art solutions monitor the magnitude of the high voltage or a voltage related thereto.

It will be readily appreciated that, while the purpose of all these circuits is to preclude a non-compliance condition with the government standards from occurring, it is equally important that the failure-circuit not operate sporadically or erroneously. An unfortunate characteristic of most of the amplitude-responsive detection systems is that they are quite prone to spurious operation from noise and other forms of interference. If precautions are taken to minimize their noise responsiveness, their "safety" value is diminished. Also, due to normal variations in device characteristics and production tolerances, it is very difficult to economically make receivers with prior art protection circuits which will assure safe operation without being prone to spurious actuation. Thus there exists a need for a reliable excessive high voltage shutdown system which exhibits greater immunity to spurious operation than systems of the prior art.

OBJECTS OF THE INVENTION

A principal object of this invention is to provide an improved television receiver deflection system.

Another object of this invention is to provide a television receiver deflection system which is precluded from developing excessive high voltage.

SUMMARY OF THE INVENTION

In accordance with the invention the width of the retrace pulse is compared with the width of a standard pulse. If the comparison indicates a retrace pulse of too short a duration, shutdown circuit means respond by disabling the deflection system.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawing, in the several figures of which like reference numerals identify like elements, and in which:

FIG. 1 is a block diagram of a television receiver incorporating the invention;

FIG. 2 is a schematic diagram of the novel portion of FIG. 1; and

FIG. 3 is a graph of waveforms present at indicated points in the circuit of FIG. 2.

DESCRIPTION OF THE PREFERRED EMBODIMENT

In FIG. 1 an antenna 10 supplies airborne television signals to a tuner 11 which, in a well known manner, develops an intermediate frequency signal and applies it to an IF amplifier and video detector 12. One output of the video detector supplies a signal to an audio system 13 which includes means for detecting and amplifying the audio accompaniment of the received television signal. The amplified audio signal is applied to a speaker 14. Another output of the video detector supplies a signal to a video system 15, where the video information is amplified and supplied to a picture tube 16 and to a sync circuit 19. Sync circuit 19 separates the horizontal and vertical synchronizing information from the video signal and supplies the vertical information to a vertical deflection system 20 and the horizontal information to a horizontal deflection system 21. A vertical yoke winding 17 and a horizontal yoke winding 18 are located on the neck of picture tube 16 and are supplied appropriate currents from vertical deflection system 20 and horizontal deflection system 21, respectively, for scansion of the electron beam in the picture tube in a rectilinear manner across the phosphor coated faceplate. An output of the horizontal circuit is also supplied to a high voltage circuit 22 which derives the necessary high operating voltage for picture tube 16.

The television receiver thus far described is well known in the art. The difference is in the provision of a shutdown circuit 23 which is supplied signals from the horizontal deflection system 21 for disabling the system in the event of an excessive high voltage condition. It will be appreciated that while the conventional television receiver shown is of the monochrome type, it would readily be capable of reproducing color television signals with well known changes in structure.

In FIG. 2 a detailed schematic diagram of horizontal deflection system 21 and shutdown circuit 23 is shown. The shutdown circuit is indicated by the dashed-line box 23 encompassing its circuit elements with the remaining elements being part of horizontal deflection system 21.

For simplicity, full details of power supply connections and various logic devices, such as inverters and OR gates, are not shown. The logic devices will be understood to have associated therewith circuitry for maintaining appropriate logic level signals at their outputs. In the description, the logic levels are considered as being 0's and 1's, though in practice these levels are defined by different potential values.

Horizontal deflection system 21 includes a horizontal oscillator 25, supplied from sync separator 19, and is shown as including an NPN amplifier transistor 26 which has a substantially square wave output. The well known circuitry for synchronizing the oscillator output signal with the sync signals from separator 19 is omitted for clarity. The oscillator signal is supplied, through a resistor 27, to the base of an NPN horizontal driver transistor 30, having an emitter connected to ground through a resistor 32 and a collector supplied with B+ through the primary winding of a transformer 31. B+ is coupled through a resistor 29 to the junction of the collector of transistor 26 and resistor 27. A capacitor 33 decouples the collector to ground. One side of the secondary winding of transformer 31 is coupled to ground through the parallel connection of a capacitor 34 and a resistor 35. The other side of the secondary winding is coupled to the base of an NPN horizontal output transistor 36, having a grounded emitter and a collector load including a deflection transformer 40.

Deflection transformer 40 has three outputs shown, one supplying horizontal yoke 18, another supplying high voltage circuit 22 and a third supplying shutdown circuit 23. The collector of horizontal output transistor 36 is coupled to ground through the parallel combination of a damper diode 37 and a transformer tuning capacitor 38.

The horizontal deflection system, including the horizontal oscillator, driver transistor, output transistor and deflection transformer are entirely conventional and form no part of the invention. The first two mentioned outputs from deflection transformer 40 comprise a sawtooth of current at line frequency rate for yoke 18 and large amplitude, short duration, retrace pulses (also at line frequency) for high voltage system 22.

The third output from deflection transformer 40 consists of positive going pulses in phase with, and related in amplitude to, the retrace pulses. These pulses are supplied to a divider network comprising resistors 41 and 42, where smaller amplitude pulses are developed. The junction of the divider network is coupled to group through a series connected pair of diodes 43 and 44 which serve to limit these pulse amplitudes. The divided-down pulses are applied to the input of an inverter 45, the output of which is coupled to a junction A on one input of an OR gate 53, and, through a capacitor 47, to a pulse forming network indicated by the dashed-line box 49. This network functions as a "one shot" multivibrator and includes an NPN transistor 50 having a base supplied from capacitor 47, a collector connected to B+ through a resistor 48 and a grounded emitter. A timing capacitor 51, in conjunction with an inverter 52, provides the RC time constant for the circuit. The output of the inverter is coupled to a junction B on the second input of OR gate 53. A feedback resistor 54 couples the base of transistor 50 to junction B for maintaining transistor 50 conductive to allow capacitor 51 to determine the duration of the pulse developed by pulse forming means 49.

The output of OR gate 53 is coupled to a junction C which is connected to B+ through a resistor 55 and also coupled, through a capacitor 56, to the base of a PNP transistor 57, having a grounded collector and an emitter connected to a junction D. Junction D is connected to B+ through a resistor 58 and to ground through a capacitor 59. Junction D is further connected to the cathode of a Zener diode 60. The anode of Zener 60 is connected to ground through a resistor 62 and to the anode of a diode 61, the cathode of which is connected to the base of horizontal driver transistor 30.

The curves A', B', C' and D' of FIG. 3 represent waveforms which may be seen at the corresponding junctions A, B, C and D of the circuit of FIG. 2. The first three curves are drawn with a 0 logic level as the base line and extend to a +1 logic level. The ordinate of the last curve is voltage. In curve A' negative going pulses 63 are derived from the horizontal retrace pulses and are indicative of their duration or width. The broken curve portions 64 represent the horizontal trace intervals. Normally pulses 63 are about 12 microseconds in duration and portions 64 about 51 microseconds long. In curve B', the positive going pulses 66 are fixed in duration and are the product of pulse forming circuit 49 in FIG. 2. Curve C' includes negative going narrow pulses 70 having a duration which is determined by the extent to which a given pulse 63 exceeds the duration of a corresponding pulse 66. Curve D' indicates a ramp waveform voltage having negative slope portions 72 and positive slope portions 71 which is supplied to the Zener diode of FIG. 2. Line 73 represents the threshold or breakdown voltage of the Zener diode.

In operation, a +1 logic pulse in time coincidence with the retrace pulse from the deflection transformer 40 is produced at the input of inverter 45 in the disabling means. When the inverter input is at +1, its output is at 0 and a negative going pulse is developed at junction A. (Pulse 63 of curve A') Pulse forming network 49 produces a positive going pulse of fixed duration in response to the positive pulse of transformer 40. OR gate 53 is arranged such that its output is always at a +1 logic level unless both its inputs are at 0. Under normal operating conditions, both inputs of OR 53 will be at 0 for a short time as indicated by its negative output pulse 70 shown in curve C'. The negative pulse results in normally charged capacitor 56 in the base of transistor 57 being discharged, which develops retrace portion 72 of waveform D' at its emitter. Conduction of transistor 57 discharges capacitor 59. Capacitor 59 in charging during nonconduction of transistor 57 develops waveform 71 of curve D' at junction D. The voltage at junction D is prevented from reaching threshold level 73 for breakdown of Zener diode 60 by periodic conduction of transistor 57, which occurs whenever a pulse 70 is generated. This, of course, corresponds to the width of pulse 63 (developed from the retrace pulse) being greater than the standard pulse 66. Under these conditions, the base voltage at driver transistor 30 is not disturbed and the deflection system operates normally.

In the event the retrace pulse diminishes in width, indicating an increase in developed high voltage, pulse 63 at junction A will be of shorter duration. In particular, should the duration of pulse 63 decrease to the point where its trailing edge coincides with the trailing edge of standard pulse 66 generated by pulse forming network 49, the inputs of OR 53 will not be at zero simultaneously and negative going pulse 70 will not be generated. Without this negative pulse, transistor 57 is not driven into conduction and capacitor 59 continues to charge until the voltage at terminal D reaches the breakdown potential indicated by threshold 73 in curve D'. Zener diode 60 serves as a detecting means by conducting and placing a positive potential, through diode 61, on the base of horizontal driver transistor 30. Driver transistor 30 is driven into heavy conduction which "swamps" out the output of horizontal oscillator 25, disables the high voltage system and inhibits development of further retrace pulses from deflection transformer 40. When no retrace pulses are presented to inverter 45, its output remains at a +1 logic level and consequently OR 53 maintains a constant +1 output level at terminal C which, effectively "locks up" the system. This condition persists until the receiver is de-energized and reactivated.

What has been described is a novel shutdown system for disabling the high voltage produced in a television receiver when the retrace pulse width decreases to that of a standard internally produced pulse. The system is highly immune to noise and is capable of controlling the rise in high voltage to within a very small percentage.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a television receiver including: a cathode ray tube requiring a high DC operating potential; a deflection system generating scansion voltages at line and field frequency rates including oscillator means producing an oscillatory signal in synchronism with the line synchronizing components in a received television signal; yoke means mounted adjacent said cathode ray tube for scanning an electron beam in said cathode ray tube across the viewing screen thereof; transformer means developing line scansion currents from said oscillatory signal for application to said yoke means, said transformer means developing retrace pulses at said line frequency rate; means developing said high DC potential from said retrace pulses; and deflection system disabling means including pulse producing means for producing a standard pulse of a predetermined duration responsive to occurrence of a retrace pulse and a comparator for comparing the duration of said retrace pulses with the predetermined duration of said standard pulse.

2. A television receiver as set forth in claim 1, wherein said comparator comprises an OR gate.

3. A television receiver as set forth in claim 1, wherein said disabling means include detecting means responsive to the output of said comparator for developing a disabling potential for said deflection system.

4. A television receiver as set forth in claim 3, wherein said deflecting system includes a horizontal driver transistor, said detecting means applying a potential for rendering said driver transistor heavily conductive.

5. A television receiver comprising a picture tube requiring a high DC potential; deflecting means, including a deflection transformer, for scanning the electron beam in said picture tube across the viewing screen thereof, said deflection transformer producing a retrace pulse at the end of each horizontal scanning of said screen; means developing said high DC potential from said retrace pulses; means generating a standard pulse, coincident with the beginning of a retrace pulse, of fixed duration; means comparing said retrace pulse duration with said standard pulse duration; and detecting means for developing a disabling voltage for said deflecting means in the event the duration of said retrace pulse decreases to said fixed duration of said standard pulse.

6. A television receiver as set forth in claim 5, wherein said detecting means includes an RC charge circuit, a Zener diode and a transistor, said RC charge circuit charging toward the breakdown level of said Zener diode; said comparing means activating said transistor to discharge said charge circuit each time a compared retrace pulse is found to be of more than said standard pulse duration.

7. A television receiver as set forth in claim 6, wherein said means generating a standard pulse include a pulse forming circuit triggered on by the leading edge of a retrace pulse.

8. In a television receiver of the type including a picture tube, deflecting means including an oscillator, a driver transistor, an output transistor, a deflection transformer and a yoke for scanning the picture tube electron beam across the viewing screen thereof, and means using the retrace pulses produced by said deflection transformer to develop high voltage for said picture tube; the improvement comprising a high voltage shutdown circuit comprising: means producing duration pulses responsive to said retrace pulses; means comparing the duration of said retrace pulses to the duration of standard pulses; and means disabling said deflecting means should the duration of said retrace pulses decrease to the duration of said standard pulses.

9. A television receiver as set forth in claim 8, further including an RC charge circuit and a Zener diode, said charge circuit charging toward the breakdown voltage for said Zener diode; and means discharging said RC charge circuit in response to each retrace pulse of longer duration than the standard pulse duration.

* * * * *